Patented Mar. 19, 1946

2,396,894

UNITED STATES PATENT OFFICE 2,396,894

PREPARATION OF SYNTHETIC RESINS FROM THIAZOLES

John Kenson Simons, Toledo, Ohio, assignor, by mesne assignments, to Libbey-Owens-Ford Glass Company, a corporation of Ohio No Drawing. Application August 29, 1942, Serial No. 456,687

8 Claims. (Cl. 260—29)

The invention relates to the preparation of novel thermosetting synthetic resins by reaction of an aldehyde with a particular type of thiazole.

Nearly all the known resins formed by the reaction of formaldehyde with various compounds are without practical value because of undesirable physical properties. Most of them are thermoplastic or so slowly thermosetting that they may be regarded for all practical purposes as thermoplastic.

Formaldehyde reacts with certain nitrogenous compounds, such as urea, to form thermosetting resins, but the resins so produced have one outstanding disadvantage, which is relatively low water resistance.

The principal object of the invention is the preparation of novel thermosetting resins having superior water resistance by reaction of aldehydes with nitrogenous compounds. More specific objects and advantages are apparent from the description, which discloses and illustrates the invention and is not intended to impose limitations upon the claims.

Thiazoles have not been known heretofore to produce thermosetting resins by reaction with aldehydes. The present invention is based upon the discovery that thiazoles of a certain type react with aldehydes to form resins that are infusible, insoluble and heat resistant and have outstanding water-resistance. The formation of thermosetting resins by reaction of thiazoles of this type with aldehydes higher than formaldehyde is extraordinary because urea, and other nitrogenous compounds in general that react with formaldehyde to form thermosetting resins, produce only thermoplastic resins by reaction with higher aldehydes.

Bis-2-amino-4-thiazolyl

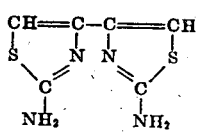

does not form thermosetting resins by reaction with aldehydes. However, it has now been discovered that thermosetting resins having the desirable properties stated above are produced by reaction of aldehydes with substances having the general formula $R_1—A_1—B—A_2—R_2$, in which $A_1$ and $A_2$ are bivalent radicals having the formula

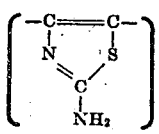

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms $—(CH_2)_n—$,

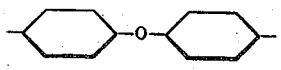

and

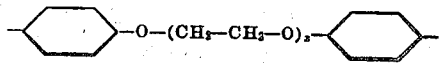

$n$ is an integer not greater than 12; and $x$ is an integer not greater than 6.

The thiazoles that are reacted with aldehydes in accordance with the invention to produce novel resins may be prepared by reacting thiourea with a dihalo diketone. Each molecule of the dihalo diketone reacts with 2 molecules of thiourea to produce the hydrohalide of a bis-2-aminothiazolyl compound, which may be treated with a base in order to set free the bis-2-amino-thiazolyl compound. If a halogen atom is attached to the carbon atom inside of the carbon atom of one of the carbonyl groups of the diketone, then the reaction with one molecule of thiourea which takes place at the two carbon atoms produces a 2-amino-5-thiazolyl group. If a halogen atom is attached to the carbon atom outside of the carbon atom of one of the carbonyl groups of the diketone, then the reaction with one molecule of thiourea which takes place at the two carbon atoms produces a 2-amino-4-thiazolyl group.

Resins that have widely varied properties and are therefore suitable for various uses may be prepared in accordance with the invention, because a large variety of dihalo diketones may be used for the reaction with thiourea to give various thiazoles that may be reacted with aldehydes to produce resins.

Certain dihalo diketones for use in such a reaction with thiourea may be prepared by carrying out a Friedel-Crafts reaction between an aromatic compound and an acyl halide.

For example, thiazoles for reaction with aldehydes in accordance with the invention may be prepared by carrying out a Friedel-Crafts reaction between a substance having the general formula

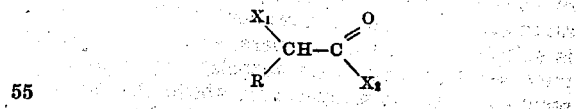

in which $X_1$ and $X_2$ are selected from the group consisting of Cl and Br, and R is selected from the group consisting of H, methyl, ethyl, n-propyl, isopropyl, phenyl and benzyl, and a substance selected from the group consisting of benzene, an alkoxy benzene having not more than two alkoxy groups each containing not more than two carbon atoms, diphenyl ether and substances having the general formula

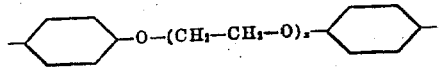

in which $x$ is an integer not greater than 6, and then reacting with thiourea the dihalo diketone so obtained. In the Friedel-Crafts reaction, in the first step of such a method, 2 mols of the halogenated acyl halide react with each mol of the aromatic compound, and in the second step of such a method, 2 mols of thiourea react with each mol of the dihalo diketone.

The preferred starting materials are chloroacetyl chloride,

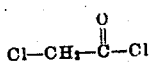

and either diphenyl ether

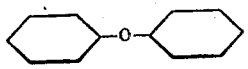

or the diphenyl ether of ethylene glycol

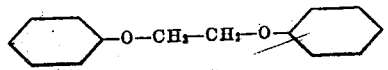

or the diphenyl ether of a polyethylene glycol containing not more than 6 ethylene groups

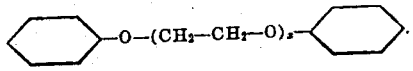

Other thiazoles for use in practicing the invention may be produced by carrying out a Friedel-Crafts reaction between 1 mol of the dihalide of a dibasic straight chain aliphatic acid containing from 3 to 14 methylene groups between the acid halide groups, and 2 mols of benzene, and then halogenating the outer-most methylene groups of the resulting diketone to produce a dihalo diketone which can be converted to a bis-thiazolyl compound by reaction with thiourea.

Still other thiazoles for use in practicing the invention may be prepared by reacting the dichloride of a straight chain aliphatic acid containing 1 to 12 methylene groups with diazomethane, reacting the resulting bis-diazo-diketone with hydrogen chloride, and reacting thiourea with the dichloro diketone so obtained.

In accordance with the invention, a thiazole of the class described may be reacted with formaldehyde, acetaldehyde, propionaldehyde, n-butyraldehyde, isobutyraldehyde, crotonaldehyde, furfuraldehyde, or a polymer thereof, such as paraformaldehyde. Preferably, it is reacted with a solution of an aldehyde in water, in an organic solvent such as alcohol, or in a liquid containing both water and an organic solvent. If an organic solvent, such as ethyl, methyl, propyl or n-butyl alcohol, or the monomethyl or monoethyl ether of ethylene glycol is employed, the solution of an intermediate reaction product that is obtained is suitable for use in lacquers, and the reaction may be performed in an autoclave if desired to secure a reaction temperature above the boiling point of the solvent. Some thiazoles of the class described are insoluble in water, but an organic solvent may be used if desired for the reaction of such thiazoles with an aldehyde.

INTERMEDIATE REACTION PRODUCT

When a formaldehyde solution is used for the reaction with the thiazole, the solution is preferably about neutral at the start of the reaction. Since commercial aqueous formaldehyde solution is strongly acid, a base is preferably added to bring the initial pH of the reaction solution to the desired value. Any desired base may be employed. If the thiazole used is insoluble in water, an organic solvent may be added to the aqueous formaldehyde solution to expedite the reaction.

From less than 1 mol to 4 or more moles of an aldehyde may be used for the reaction with each mol of the thiazole. Because of the complexity of the molecules of the reaction product, the proportion of the aldehyde actually reacting with each mol of the thiazole can vary from 1 mol to as many as 4 mols. An excess of either reactant may be used if desired, although an unreacted uncombinable excess of one of the reactants is not usually desirable in the final product. The preferred proportion is from about 1½ to 2½ mols of the aldehyde for each mol of the thiazole.

The reaction proceeds at ordinary temperatures, but is expedited by heating. An intermediate reaction product may be prepared by carrying the reaction of the aldehyde and thiazole only to its earliest stage, for example, the stage at which the reacting ingredients have just dissolved to form a solution, or the reaction or condensation may be carried to any further stage (short of the final, infusible resinous stage) at which the product may still be called an intermediate reaction product. By thus advancing the reaction, it is possible to obtain an interesting reaction product that is insoluble but still fusible.

Some of the thiazoles described form only water-insoluble reaction products by reaction with formaldehyde or other aldehydes, but a stable solution of an intermediate reaction product in an organic solvent can ordinarily be prepared.

For many purposes it is convenient to allow the soluble type of intermediate reaction product to remain in the form of a solution. Such a solution, after the addition of any desired ingredients, may be used as a binder in the production of impregnated or laminated products, as an adhesive for applications, such as the manufacture of plywood, as a dressing or creaseproofing agent for textiles, as an ingredient for lacquers or coating compositions, as a flameproofing agent for wood, and as a composition to be converted into a foam that can be hardened to produce an insulating material.

An intermediate reaction product may be obtained in dry form from a solution by evaporating or diluting it, to adjust its concentration to the proper value, and then spray-drying or vacuum drum-drying. It is usually more convenient to ship or store an intermediate reaction product in dry form than in the form of a solution. Various ingredients, such as fillers, pigments and hardening catalysts may be mixed with a dry intermediate reaction product so that a coating compound, adhesive, binder or impregnating agent of the desired composition may be obtained by simply adding water or other solvent to the dry mixture.

The product is most stable in storage when it is substantially neutral. Thus, it is desirable to neutralize a solution of an intermediate reaction product before spray-drying or vacuum drum-drying.

An acid catalyst may be used in hardening or converting the intermediate reaction product into an infusible resin. Since the action of the catalyst is due solely to its acidity, any acid substance, such as an inorganic acid, an organic acid, or an acid salt such as an ammonium salt of a strong inorganic acid, may be used as the catalyst. The acidity may be furnished by mere addition of an acid substance to the intermediate reaction product, but acidity to catalyze the conversion of the intermediate reaction product to an infusible resin is preferably provided by incorporating a latent acid catalyst with the intermediate reaction product. A latent acid catalyst is a substance which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate.

*Example 1*

Two mols of chloroacetyl chloride are mixed with 1 mol of diphenyl ether. The mixture is then added slowly to a well-stirred suspension of 2 mols of anhydrous aluminum chloride in 850 cc. of carbon disulfide contained in a vessel surrounded by ice. After the addition of all the reactants, a reddish oil is present. In order to keep the oil mobile enough for continued stirring, the reaction vessel is surrounded with luke-warm water while the reaction is continued for 4 hours. Hydrogen chloride is liberated. The carbon disulfide is then poured off and the reddish oil is decomposed by addition of water containing sufficient hydrochloric acid to prevent the aluminum chloride from hydrolyzing to aluminum hydroxide. The resulting precipitate is separated and may be purified by crystallization from alcohol to produce a 50 per cent yield of p,p'-bis-chloroacetyl-diphenyl ether, which is a nearly white solid melting at 99–102° C. The foregoing step is a typical Friedel-Crafts reaction. 150 grams of this substance, 250 grams of thiourea, and 750 cc. of water containing 4 cc. of concentrated hydrochloric acid are heated on a water bath until precipitation of the resulting hydrochloride has been completed. The precipitate is separated and then dissolved in 9 liters of boiling water. After filtration, the hot solution is neutralized with a solution of sodium bicarbonate. The solid product is filtered, washed, and then recrystallized from the monomethylether of ethylene glycol to give the p,p'-bis-2-amino-4-thiazolyl diphenyl ether

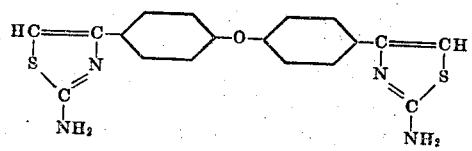

which melts at 246–248° C. The over-all yield of this product based on the amount of diphenyl ether used is about 44 per cent.

One mol of this product and 2 mols of formaldehyde in a 37 per cent aqueous solution whose pH has initially been adjusted to a value from about 6.5 to about 7.5, e. g. 6.8, are reacted to form an intermediate reaction product. If the reaction is carried out by heating at 90 to 120° C. for a few minutes, the thiazole does not dissolve but is converted by reaction with the formaldehyde to an amorphous semi-solid product that is transformed into an infusible resin either by heating or by acidification. An alkali also acts as a catalyst to cause conversion of this intermediate reaction product to an infusible resin, since such conversion is produced at ordinary temperatures by addition of an alkali to the intermediate reaction product. Any alkaline material may be employed. Preferably, a solution is prepared by warming the thiazole with ethylene glycol monomethyl ether before the formaldehyde solution is added. The resulting 40 per cent solution of an intermediate reaction product is brought to a pH of about 6 by addition of maleic acid and is then evaporated to a suitable consistency for use as an adhesive. Birch plies may be coated on one side with about 15 to 16 grams of the adhesive per square foot, allowed to dry for 1 hour, assembled and then pressed at 250° F. for 15 minutes. The adhesive bond in the resulting plywood has excellent water-resistance.

*Example 2*

18 grams of the thiazole prepared in accordance with Example 1, 20 cc. of butyraldehyde, or an equivalent amount of crotonaldehyde or furfuraldehyde, 1 cc. of a 10 per cent aqueous sodium hydroxide solution and 80 cc. of ethylene glycol monoethyl ether are heated to produce a viscous solution. The reaction product in this solution is converted to an infusible resin by slightly acidifying and then heating.

*Example 3*

40 grams of sodium hydroxide and 94 grams of phenol are dissolved in 100 cc. of water. After the addition of 100 cc. of alcohol and 94 grams of ethylene dibromide, the solution is refluxed for 16 hours, filtered and then cooled. The solid diphenyl ether of ethylene glycol that separates, after recrystallization from alcohol, has a melting point of 97° C. A mixture of 48 grams of this substance and 40 cc. of chloracetyl chloride is added slowly to a well-stirred suspension of 60 grams of anhydrous aluminum chloride in 300 cc. of carbon disulfide contained in a vessel surrounded by ice. After this addition, the reaction vessel is surrounded with luke-warm water while the reaction is continued for 4 hours. The carbon disulfide layer is decanted and the oil that remains is decomposed by addition of water containing sufficient hydrochloric acid to prevent the precipitation of aluminum hydroxide. The dichloro diketone which separates as a precipitate melts at 155–165° C. Thirty grams of this substance and 16.5 grams of thiourea are dissolved in n-butanol and heated at boiling temperature until precipitation of the resulting hydrochloride has been completed. The precipitate is dissolved in water and the aqueous solution is neutralized with sodium bicarbonate and then boiled to cause precipitation of the bis-2-amino-4-thiazolyl diphenyl ether of ethylene glycol, which has a melting point of 255–260° C. The product may be treated in the same manner as the thiazole in Example 1 to produce an intermediate reaction product with formaldehyde.

Example 4

The procedure of Example 3 is followed except that 72 grams of β,β'-di-chloroethyl ether are used instead of the 94 grams of ethylene dibromide, and the initial product is the diphenyl ether of diethylene glycol having a melting point of 65-70° C. The procedure of Example 3 is then continued using a mixture of 26 grams of this substance with 18 cc. of chloracetyl chloride and a suspension of 25 grams of anhydrous aluminum chloride in 120 cc. of carbon disulfide. In the next step of the reaction, 16.5 grams of dichloro diketone and 10 grams of thiourea are employed. The thiazole is a bis-2-amino-4-thiazolyl diphenyl ether of diethylene glycol having a melting point of 178-179° C.

Example 5

The procedure of Example 3 is followed except that 94 grams of the β,β'-di-chlorethyl ether of ethylene glycol are used instead of the 94 grams of ethylene dibromide. At the end of the 16 hours of refluxing in the first step, sodium chloride has separated out and the supernatant liquid is decanted from the sodium chloride. After the decanted liquid has been allowed to cool, an oil layer can be separated. Drying this oil by means of calcium chloride followed by distillation gives as the distillate the diphenyl ether of triethylene glycol, which boils at 240° C. under a pressure of 15 mm. of mercury and has a melting point of 42° C. The procedure of Example 3 is then continued using a mixture of 30 grams of this substance with 22 cc. of chloracetyl chloride and a suspension of 35 grams of anhydrous aluminum chloride in 200 cc. of carbon disulfide. In the next step of the reaction, 30 grams of the dichloro diketone and about 20 grams of thiourea are employed. The thiazole is a bis-2-amino-4-thiazolyl diphenyl ether of triethylene glycol which sinters at 150° C. and melts at 165° C.

Example 6

A mixture of 15 grams of anisole and 90 grams of bromo-acetyl bromide is added slowly to a well-stirred suspension of 40 grams of anhydrous aluminum chloride in 230 grams of carbon disulfide contained in a vessel surrounded by ice. After this addition, the reaction vessel is surrounded with luke-warm water while the reaction is continued for 4 hours. The resulting solution together with sufficient hydrochloric acid to prevent the precipitation of aluminum hydroxide is then poured on ice. The non-aqueous product is separated from the ice and extracted with diethyl ether and the ether extract is evaporated to a residue that is still liquid. Then after the addition of 70 cc. of ethyl alcohol, the product is cooled to crystallize the bis-bromacetyl anisole, which has a melting point of 76-80° C. A solution of 3.3 grams of this substance and 1.4 grams of thiourea in 30 cc. of 60 per cent ethyl alcohol is heated on a water bath for 2 hours. After cooling, a precipitate of the hydrochloride can be separated. The precipitate is dissolved in 40 cc. of hot water containing 1.5 grams of sodium bicarbonate to cause precipitation of the bis-2-amino-4-thiazolyl anisole which has a melting point of 205-208° C. The thiazole so prepared may be reacted with formaldehyde in the same manner as the thiazole prepared in accordance with Example 1. In this case, however, the intermediate reaction product is soluble in water so that it is not necessary to add ethylene glycol monomethyl ether unless it is desired to prepare a stable solution.

Example 7

One hundred twenty grams of sebacyl dichloride is added with stirring slowly to 150 grams of anhydrous aluminum chloride in 600 cc. of benzene contained in a vessel surrounded by ice, the addition requiring about 30 minutes. The surrounding ice is then removed and stirring is continued for 1 hour and 45 minutes until the contents of the vessel has substantially attained room temperature. The contents of the vessel is then poured upon a mixture of 600 grams of ice and 122 cc. of concentrated hydrochloric acid. Sufficient additional benzene is then added to cause all of the white precipitate to dissolve and the benzene solution is separated. After the benzene solution has been washed with a dilute solution of sodium carbonate, the benzene solution is dehydrated by means of calcium chloride and the benzene is distilled off. The residue of alpha,omega-dibenzoyl octane is purified by recrystallization from alcohol. Forty grams of the product and 180 cc. of carbon tetrachloride are heated under reflux and about 40 grams of bromine are added one drop at a time, until no further absorption of bromine occurs. Distillation is then carried out to produce a concentrated solution, which is cooled to cause crystallization. The crystalline product, which is purified by washing with a petroleum ligroin, melts at 83° C. and has the structural formula

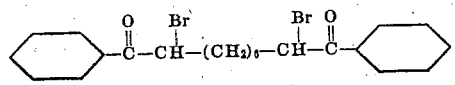

A solution of 40.5 grams of this substance and 12 grams of thiourea in 300 cc. of 65 per cent ethyl alcohol is heated on a water bath with stirring until precipitation of the resulting hydrochloride has been completed. The precipitate is dissolved in hot water and the aqueous solution is neutralized with sodium carbonate to cause precipitation of a 36 gram yield of alpha,omega-bis-2-amino-4-phenyl-5-thiazolyl hexane, which melts at 202-204° C. and has the structural formula

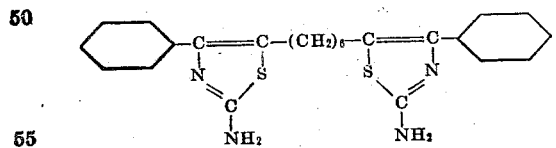

The product may be treated in the same manner as the thiazole of Example 1 to produce an intermediate reaction product with formaldehyde.

Example 8

Sixteen grams of α-chlorpropionyl chloride are mixed with 10 grams of diphenyl ether. The mixture is then added to a well-stirred suspension of 15 grams of anhydrous aluminum chloride in 75 cc. of carbon disulfide contained in a vessel surrounded by ice. After this addition, the reaction vessel is surrounded with luke-warm water while the reaction is continued for 4 hours. The carbon disulfide is decanted and the oil that remains is decomposed by addition of water containing sufficient hydrochloric acid to prevent the precipitation of aluminum hydroxide. The resulting product which separates as a precipitate is p,p'-bis-alpha-chloro-propionyl diphenyl ether, having a melting point of 78–85° C. Eleven grams of this substance and 8 grams of thiourea are dissolved in n-butanol and heated at boiling temperature until precipitation of the resulting hydrochloride has been completed. The precipitate is dissolved in water and the aqueous solution is neutralized with sodium carbonate and then boiled to cause precipitation of p,p'-bis-5-methyl-2-amino-4-thiazolyl diphenyl ether which melts at 244–246° C. and has the structural formula

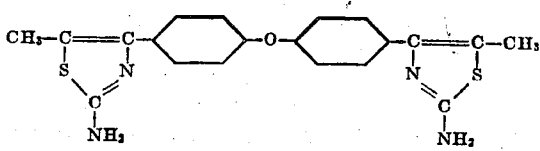

The product may be treated in the same manner as the thiazole of Example 1 to produce an intermediate reaction product with formaldehyde.

*Example 9*

A solution of 65 grams of adipyl dichloride in 250 cc. of dry diethyl ether is added in portions to 2½ liters of a dry diethyl ether solution of diazo methane prepared from about 180 grams of nitroso methyl urea. The tetramethylene bis-diazo-dimethyl diketone that precipitates is filtered off and an additional quantity is recovered by evaporation of the mother liquor. Hydrogen chloride gas is then passed into a solution of the product in chloroform and diethyl ether until the yellow color has disappeared. The tetramethylene di-chloromethyl diketone that precipitates is filtered off. One mol of this product is reacted with 2 mols of thiourea by heating on a water bath in solution, with 60 per cent ethyl alcohol as the solvent. The precipitated hydrochloride is separated and then treated with an aqueous solution of sodium bicarbonate to produce a 45 per cent over-all yield of the 1,4-bis-2-amino-4-thiazolyl butane, having a melting point of 216° C.

The thiazole so prepared may be reacted with formaldehyde in the same manner as the thiazole prepared in accordance with Example 1. In this case, however, the intermediate reaction product is soluble in water so that it is not necessary to add ethylene glycol monomethyl ether unless it is desired to prepare a stable solution.

*Example 10*

Twenty-five grams of the thiazole prepared in accordance with Example 9, 100 cc. of n-butanol, 1 cc. of a 50 per cent aqueous solution of triethanolamine and 40 grams of a 37 per cent aqueous solution of formaldehyde (which contains 2½ mols of formaldehyde for each mol of the thiazole) are heated on a water bath. A solution quickly forms. A solution of 1 gram of maleic acid in a small amount of n-butanol is added and water is removed by azeotropic distillation, the n-butanol being separated from the distillate and returned to the solution. After substantially all of the water has been removed, the solution is evaporated to a final weight of about 90 grams. The resulting coating composition when poured out in a film and baked for 30 minutes at 105° C. produces a very hard transparent infusible film.

*Example 11*

The procedure of Example 9 is carried out except that instead of the 65 grams of adipyl dichloride, an equivalent amount of sebacyl dichloride is employed. The thiazole in this case is 1,8-bis-2-amino-4-thiazolyl octane, having a melting point of 180° C. The over-all yield of this compound is 67 per cent.

PRODUCTION OF ARTICLES OF INFUSIBLE RESIN

Fillers, plasticizers, hot plate lubricants, opacifiers, dyestuffs, pigments and other coloring matter may be incorporated with the intermediate reaction product to produce a suitable molding composition. In the preferred method of preparing a molding composition, the filler is impregnated with a solution of a soluble intermediate reaction product, and the solvent is then removed.

If fibrous cellulosic material in the form of paper pulp, wood flour or the like is employed as the filler, a solution of the intermediate reaction product used for impregnating the cellulosic material is preferably rendered acid (pH of about 4 to about 6). Heat may be used to facilitate the drying of the impregnated cellulose or other filler. Of course, the drying temperature should not be sufficient to render the molding composition infusible. After the water or other solvent has been removed, the dry product may be ground in a ball mill to produce a homogeneous powder; and modifiers, such as plasticizers, lubricants and pigments, may be incorporated in the grinding operation. If desired, the powder may be compressed into blanks or preforms of the proper sizes for use in various molds. The molding composition may be employed in the usual manner for the production of molded articles by compressing it in a closed mold at a pressure of 1 to 4 tons per square inch of projected area and a temperature between 100° C. and 200° C., preferably about 140–150° C., for a period of 1 to 5 minutes.

Articles of infusible resin embodying the invention may be produced by methods other than preparing and hot-pressing a molding composition, for example, by casting in open molds and baking. In any case, if no filler is used, transparent articles can be produced.

When the synthetic resins of the present invention are utilized, the intermediate reaction products that have been described can be incorporated in a great variety of other resins or potential resins such as urea-formaldehyde resins and phenol-formaldehyde resins. Also, reaction products of an aldehyde or a mixture of aldehydes with a mixture of the thiazoles with one another or with other substances, such as urea and thiourea, can be produced. The intermediate reaction products in the resulting compositions may then be converted into the infusible resins, and a blend or copolymer of different resins may thus be obtained.

*Example 12*

The 40 per cent solution of the intermediate reaction product having a pH of about 6, as prepared in accordance with Example 1, or a similar solution prepared in accordance with Examples 3, 4, 5, 6, 7, 8, 9 or 11, is used to impregnate about one-fourth of its weight of alpha-cellulose and the impregnated alpha-cellulose is subjected to a stream of warm dry air. When the product is dry, it is ground in a ball mill to produce a molding powder.

Articles molded from the resulting composition have very high water-resistance.

Example 13

Ninety grams of the thiazole prepared in accordance with Example 1, 60 grams of powdered alpha-cellulose, 2 grams of zinc stearate, 40 grams of a 37 per cent aqueous solution of formaldehyde and 1/16 cc. of a 10 per cent aqueous sodium hydroxide solution are kneaded in a Banbury mixer while slightly warm to produce a homogeneous mass. The material is dried for about 10 minutes at 185° F. and is then ground in a ball mill to produce a molding powder. Articles molded from the resulting composition are very fast curing in the mold and have excellent water-resistance.

Various embodiments of the invention may be devised to meet various requirements.

Having described the invention, I claim:

1. A method of producing a synthetic resin that comprises reacting a substance, selected from the group consisting of formaldehyde, acetaldehyde, propionaldehyde, n-butyraldehyde, isobutyraldehyde, crotonaldehyde, and furfuraldehyde, with a substance having the general formula $R_1-A_1-B-A_2-R_2$, in which $A_1$ and $A_2$ are bivalent radicals having the formula

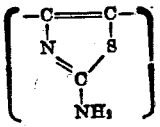

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms, $-(CH_2)_n-$,

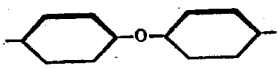

and

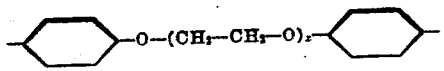

$n$ is an integer not greater than 12; and $x$ is an integer not greater than 6.

2. A method of producing an intermediate reaction product capable of conversion into an infusible resin that comprises reacting formaldehyde with a substance having the general formula $R_1-A_1-B-A_2-R_2$, in which $A_1$ and $A_2$ are bivalent radicals having the formula

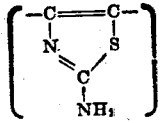

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms, $-(CH_2)_n-$,

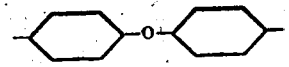

and

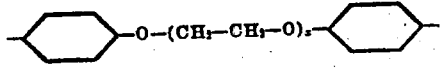

$n$ is an integer not greater than 12; and $x$ is an integer not greater than 6.

3. A reaction product of an aldehyde selected from the group consisting of formaldehyde, acetaldehyde, propionaldehyde, n-butyraldehyde, isobutyraldehyde, crotonaldehyde, and furfuraldehyde, with a substance having the general formula $R_1-A_1-B-A_2-R_2$, in which $A_1$ and $A_2$ are bivalent radicals having the formula

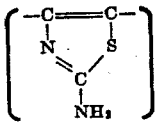

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms, $-(CH_2)_n-$,

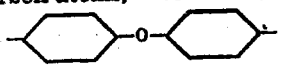

and

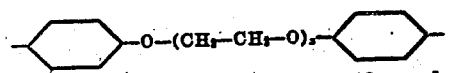

$n$ is an integer not greater than 12; and $x$ is an integer not greater than 6.

4. An intermediate reaction product of formaldehyde with a substance having the general formula $R_1-A_1-B-A_2-R_2$, in which $A_1$ and $A_2$ are bivalent radicals having the fromula

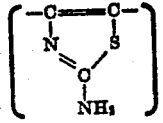

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms, $-(CH_2)_n-$,

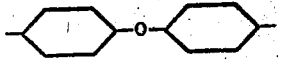

and

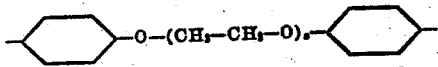

$n$ is an integer not greater than 12; and $x$ is an integer not greater than 6, capable of conversion into an infusible resin.

5. An intermediate reaction product of formaldehyde with a bis-2-amino-4-thiazolyl diphenyl ether of ethylene glycol, capable of conversion into an infusible resin.

6. An intermediate reaction product of formaldehyde with a bis-2-amino-4-thiazolyl diphenyl ether of a polyethylene glycol containing not more than six ethylene groups, capable of conversion into an infusible resin.

7. An intermediate reaction product of formaldehyde with p,p'-bis-2-amino-4-thiazolyl diphenyl ether, capable of conversion into an infusible resin.

8. An organic solution comprising an intermediate reaction product of an aldehyde selected from the group consisting of formaldehyde, acetaldehyde, propionaldehyde, n-butyraldehyde, isobutyraldehyde, crotonaldehyde, and furfuraldehyde, with a substance having the general formula $R_1-A_1-B-A_2-R_2$, in which $A_1$ and $A_2$ are bivalent radicals having the formula

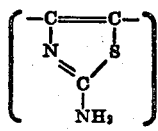

$R_1$ and $R_2$ are monovalent radicals selected from the group consisting of H, methyl, ethyl, n-propyl, isopropyl, phenyl and benzyl; B is a bivalent radical selected from the group consisting of phenylene, alkoxy phenylene having not more than two alkoxy groups each containing not more than two carbon atoms, $-(CH_2)_x-$,

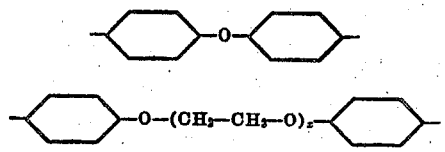

and $n$ is an integer not greater than 12; and $x$ is an integer not greater than 6, capable of conversion into an infusible resin, and an alcoholic solvent for such intermediate reaction product.

JOHN KENSON SIMONS.